I. W. MEAD.
TAMPING-TOOL.

No. 191,164. Patented May 22, 1877.

WITNESSES
F. J. Masi
Walter C. Masi

INVENTOR
Ira W. Mead,
by E. W. Anderson,
ATTORNEY

UNITED STATES PATENT OFFICE.

IRA W. MEAD, OF FALLS VILLAGE, CONNECTICUT.

IMPROVEMENT IN TAMPING-TOOLS.

Specification forming part of Letters Patent No. 191,164, dated May 22, 1877; application filed March 24, 1877.

*To all whom it may concern:*

Be it known that I, IRA W. MEAD, of Falls Village, in the county of Litchfield, and State of Connecticut, have invented a new and valuable Improvement in Tamping-Tools; and I do hereby declare that the following is a full, clear, and exact description of the construction and operation of the same, reference being had to the annexed drawings, making a part of this specification, and to the letters and figures of reference marked thereon.

Figure 1:
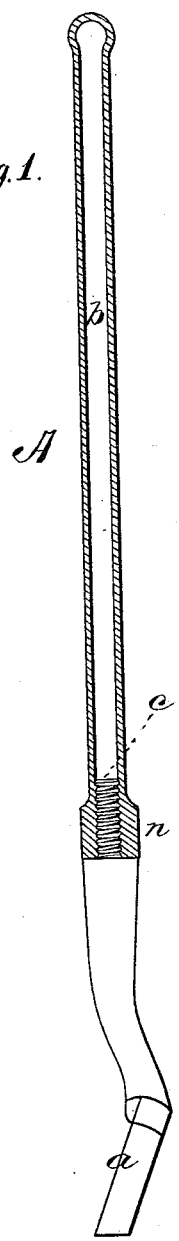
Figure 2:
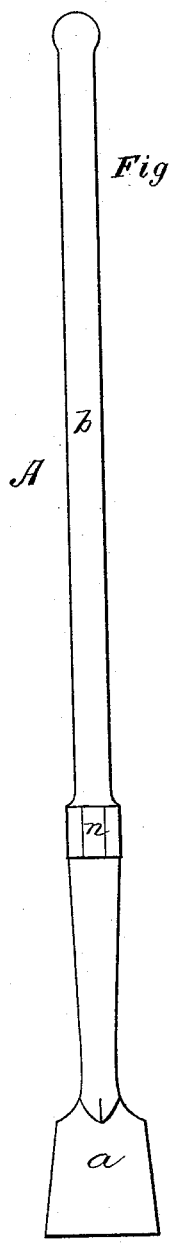

Figure 1 of the drawings is a representation of a longitudinal central section of the handle and the upper part of the blade-shank of my improved tamping-tool, and Fig. 2 is a side view thereof.

This invention has relation to improvements in tamping-tools for railroad purposes.

The object of my invention is mainly to devise a tool of this description, which will be very light, and consequently entail comparatively little labor upon the workmen, and the parts of which, when broken or worn out, may be replaced by duplicates of such parts, and the tool thus restored to its former efficiency.

The nature of the invention consists in a tamping-tool having a tubular metallic handle that is removably secured to the blade, as hereinafter more fully set forth.

In the annexed drawings, the letter A designates my improved tamping-bar, that is composed of a preferably cast-steel blade, $a$, and a tubular handle, $b$.

The shank of the blade terminates in a screw-threaded rabbet, $c$, that is received in the end of handle $b$, threaded to correspond. As shown in Fig. 2, the adjoining end of the handle $b$ is somewhat enlarged and is prismatic in shape. This enlargement $n$ serves to strengthen the handle after the manner of a re-enforcement, and thereby prevents it from splitting when in use, while the polygonal form of said enlargment permits a wrench to be used in applying or removing the handle from the blade, thereby securing a properly-rigid connection of the parts of the tool and a ready means for separating the same when required.

The handle $b$, as aforesaid, is tubular, and will be made of any suitable metal of adequate rigidity.

By this means the weight of the handle is considerably diminished, (about one-half,) and the labor of using the tool proportionately decreased, without appreciable loss of strength or rigidity in said handle.

I am aware that hollow handles have been applied to brushes, brooms, and other analogous articles; hence I make no claim to such application.

Having described my invention, what I claim as new, and desire to secure by Letters Patent, is—

1. A tamping-tool consisting of a blade and tubular handle removably secured together, substantially as specified.

2. In a tamping-tool, the blade $a$, having a screw-threaded rabbet, $c$, and the tubular screw-threaded handle $b$, having prismatic enlargement $n$, combined substantially as specified.

In testimony that I claim the above I have hereunto subscribed my name in the presence of two witnesses.

IRA W. MEAD.

Witnesses:
 MARION A. DEAN,
 MURRAY A. BROWN.